(12) United States Patent
Lemmer

(10) Patent No.: US 12,415,565 B2
(45) Date of Patent: Sep. 16, 2025

(54) METHOD FOR OPERATING A CONTROL DEVICE FOR CONTROLLING AN ELECTRIC MOTOR, IN PARTICULAR A STEERING SYSTEM

(71) Applicant: Robert Bosch GmbH, Stuttgart (DE)

(72) Inventor: Paul Lemmer, Goeggingen (DE)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 18/329,304

(22) Filed: Jun. 5, 2023

(65) Prior Publication Data

US 2023/0391395 A1 Dec. 7, 2023

(30) Foreign Application Priority Data

Jun. 7, 2022 (DE) ..................... 10 2022 205 740.6

(51) Int. Cl.
*B62D 5/04* (2006.01)

(52) U.S. Cl.
CPC ......... *B62D 5/0493* (2013.01); *B62D 5/0406* (2013.01); *B62D 5/0484* (2013.01)

(58) Field of Classification Search
CPC .... B62D 5/0493; B62D 5/0484; B62D 5/046; H02P 27/06; H02P 29/024
See application file for complete search history.

(56) References Cited

U.S. PATENT DOCUMENTS

| | | | | |
|---|---|---|---|---|
| 1,348,397 A | * | 8/1920 | Dunlop | H01H 9/0066 200/7 |
| 3,686,548 A | * | 8/1972 | Onoda | H02P 27/06 318/803 |
| 4,665,698 A | * | 5/1987 | Trusock | B66F 9/22 60/422 |

(Continued)

FOREIGN PATENT DOCUMENTS

| | | | | |
|---|---|---|---|---|
| CN | 103633921 A | * | 3/2014 | ........... B62D 5/0484 |
| DE | 102010056323 A1 | * | 6/2012 | ............. B60L 1/003 |

(Continued)

OTHER PUBLICATIONS

"Innovation drivers for electric power-assisted steering;" Burton et al., IEEE Control Systems (vol. 23, Issue: 6, 2003, pp. 30-39); Dec. 1, 2003. (Year: 2003).*

(Continued)

*Primary Examiner* — Khoi H Tran
*Assistant Examiner* — Jorge O Peche
(74) *Attorney, Agent, or Firm* — Maginot, Moore & Beck LLP

(57) ABSTRACT

In a method for operating a control device for controlling an electric motor, in particular a steering system, in which the control device includes at least one power supply, at least one power element which is operatively connected to the power supply, at least one reverse polarity protection switch arranged in a power current path between the power supply and the power element, and at least one logic unit, at least (Continued)

one first voltage value correlated with an intermediate circuit voltage and at least one second voltage value correlated with a supply voltage of the logic unit are determined and linked to one another and evaluated to determine a faulty actuation of the reverse polarity protection switch.

20 Claims, 3 Drawing Sheets

(56) References Cited

U.S. PATENT DOCUMENTS

| | | | | | |
|---|---|---|---|---|---|
| 4,836,319 | A * | 6/1989 | Haseda | | B62D 7/159 701/42 |
| 5,295,550 | A * | 3/1994 | Chikuma | | B62D 7/1581 180/412 |
| 5,360,077 | A * | 11/1994 | Nishimoto | | B62D 5/0478 701/43 |
| 5,552,684 | A * | 9/1996 | Wada | | B62D 5/0487 361/33 |
| 5,668,721 | A * | 9/1997 | Chandy | | B62D 5/0466 701/41 |
| 5,668,722 | A * | 9/1997 | Kaufmann | | B62D 5/0466 701/41 |
| 5,704,446 | A * | 1/1998 | Chandy | | B62D 5/0466 701/41 |
| 5,719,766 | A * | 2/1998 | Bolourchi | | B62D 5/0466 701/42 |
| 5,726,541 | A * | 3/1998 | Glenn | | B60L 50/52 318/16 |
| 6,016,042 | A * | 1/2000 | Miura | | H02P 7/04 318/434 |
| 6,122,579 | A * | 9/2000 | Collier-Hallman | | B62D 5/0472 318/432 |
| 6,246,197 | B1 * | 6/2001 | Kurishige | | B62D 5/046 318/434 |
| 6,427,105 | B1 * | 7/2002 | Matsushita | | B62D 5/046 701/41 |
| 7,837,004 | B2 * | 11/2010 | Yasuda | | B62D 5/008 180/407 |
| 8,950,520 | B2 * | 2/2015 | Hauser | | B62D 5/046 180/6.24 |
| 10,093,352 | B2 * | 10/2018 | Mori | | B62D 5/0484 |
| 10,640,113 | B2 * | 5/2020 | Wolff | | B60W 10/08 |
| 10,668,945 | B2 * | 6/2020 | Taki | | B62D 5/0403 |
| 11,063,545 | B2 * | 7/2021 | Koikegami | | H02P 29/028 |
| 11,472,472 | B2 * | 10/2022 | Koikegami | | G01R 31/42 |
| 11,736,048 | B1 * | 8/2023 | Pramod | | B62D 5/0409 318/696 |
| 2001/0053952 | A1 * | 12/2001 | Kodaka | | B62D 5/0484 180/443 |
| 2002/0060105 | A1 * | 5/2002 | Tominaga | | H02K 11/33 180/443 |
| 2003/0057913 | A1 * | 3/2003 | Matsushita | | H02P 21/22 318/727 |
| 2003/0107339 | A1 * | 6/2003 | Shimizu | | B62D 5/046 318/434 |
| 2005/0082106 | A1 * | 4/2005 | Husain | | B62D 5/0469 180/402 |
| 2005/0179428 | A1 * | 8/2005 | Hiramine | | H02M 7/53873 324/177 |
| 2005/0258792 | A1 * | 11/2005 | Matsuda | | H02M 7/48 318/432 |
| 2007/0000718 | A1 * | 1/2007 | Sawano | | B62D 5/0484 180/446 |
| 2007/0043490 | A1 * | 2/2007 | Yokota | | B62D 5/0463 701/41 |
| 2007/0090782 | A1 * | 4/2007 | Endo | | B62D 5/046 318/432 |
| 2007/0103105 | A1 * | 5/2007 | Endo | | B62D 5/046 318/432 |
| 2007/0146169 | A1 * | 6/2007 | Otsuka | | G01D 5/24461 341/15 |
| 2007/0199764 | A1 * | 8/2007 | Kifuku | | B62D 5/0463 180/446 |
| 2007/0229021 | A1 * | 10/2007 | Yoshida | | H02P 6/185 318/807 |
| 2007/0248338 | A1 * | 10/2007 | Kaneko | | H02P 21/22 388/823 |
| 2008/0067960 | A1 * | 3/2008 | Maeda | | B62D 5/046 180/443 |
| 2008/0191655 | A1 * | 8/2008 | Ueda | | B62D 5/0487 318/449 |
| 2008/0228354 | A1 * | 9/2008 | Kimura | | B62D 5/0463 701/42 |
| 2008/0277188 | A1 * | 11/2008 | Hauser | | B62D 11/04 180/422 |
| 2008/0290826 | A1 * | 11/2008 | Nagase | | H02P 21/04 318/400.09 |
| 2009/0120714 | A1 * | 5/2009 | Hisanaga | | B62D 5/0466 180/446 |
| 2009/0224619 | A1 * | 9/2009 | Okubo | | H02K 29/03 310/156.25 |
| 2010/0019708 | A1 * | 1/2010 | Okubo | | B62D 5/046 318/400.19 |
| 2010/0283348 | A1 * | 11/2010 | Okubo | | H02K 29/03 310/156.47 |
| 2013/0328512 | A1 * | 12/2013 | Ozaki | | H02H 7/0805 361/31 |
| 2014/0139158 | A1 * | 5/2014 | Tomita | | H02P 29/0243 318/400.21 |
| 2014/0340015 | A1 * | 11/2014 | Hirotani | | H02P 25/026 318/400.42 |
| 2016/0111988 | A1 * | 4/2016 | Suzuki | | B62D 5/0484 180/446 |
| 2016/0200355 | A1 * | 7/2016 | Mori | | H02P 21/22 180/446 |
| 2017/0282968 | A1 * | 10/2017 | Kezobo | | G01R 31/006 |
| 2018/0175779 | A1 * | 6/2018 | Koseki | | H02P 29/032 |
| 2018/0208237 | A1 * | 7/2018 | Kumagai | | H02M 7/48 |
| 2019/0280638 | A1 * | 9/2019 | Saito | | H02P 29/0241 |
| 2019/0293501 | A1 * | 9/2019 | Tanaka | | F16H 59/16 |
| 2019/0293502 | A1 * | 9/2019 | Arimura | | F16H 57/0476 |
| 2020/0001913 | A1 * | 1/2020 | Kim | | B62D 5/0484 |
| 2020/0186075 | A1 * | 6/2020 | Koikegami | | H02P 29/028 |
| 2020/0247464 | A1 * | 8/2020 | Koikegami | | H03K 17/0822 |
| 2022/0219549 | A1 * | 7/2022 | Slepchenkov | | B60L 58/16 |
| 2023/0208230 | A1 * | 6/2023 | Pramod | | H02P 21/22 310/184 |
| 2023/0391395 | A1 * | 12/2023 | Lemmer | | B62D 5/0484 |
| 2023/0400530 | A1 * | 12/2023 | Ives | | H02P 29/024 |
| 2023/0402954 | A1 * | 12/2023 | Ives | | H02M 7/08 |
| 2024/0266984 | A1 * | 8/2024 | Tanabe | | H02P 29/032 |
| 2024/0429698 | A1 * | 12/2024 | Subramaniam | | H02P 29/024 |
| 2024/0429699 | A1 * | 12/2024 | Subramaniam | | H02H 3/087 |

FOREIGN PATENT DOCUMENTS

| | | | |
|---|---|---|---|
| DE | 10 2019 206 693 A1 | 11/2020 | |
| EP | 122807 A * | 10/1984 | B66F 9/22 |
| EP | 1759956 A1 * | 3/2007 | B62D 5/0463 |
| JP | 3511563 B2 * | 3/2004 | |
| JP | 2017077832 A * | 4/2017 | |
| KR | 20120061437 A * | 6/2012 | |
| WO | WO-2018065409 A1 * | 4/2018 | B62D 5/0481 |
| WO | WO-2018088111 A1 * | 5/2018 | B60R 16/02 |
| WO | WO-2018180238 A1 * | 10/2018 | B62D 5/0403 |
| WO | WO-2019054026 A1 * | 3/2019 | B62D 5/0421 |

OTHER PUBLICATIONS

"Electric steering power electronics;" Valentine; Power Electronics in Transportation (1996, pp. 105-110); Jan. 1, 1996. (Year: 1996).*
"Analysis of the Sources of Error Within PMSM-Based Electric Powertrains—A Review;" Wireko-Brobby et al.; IEEE Transactions

(56) References Cited

OTHER PUBLICATIONS on Transportation Electrification (vol. 10, Issue: 3, 2024, pp. 6370-6406); Sep. 1, 2024. (Year: 2024).*

* cited by examiner

METHOD FOR OPERATING A CONTROL DEVICE FOR CONTROLLING AN ELECTRIC MOTOR, IN PARTICULAR A STEERING SYSTEM

This application claims priority under 35 U.S.C. § 119 to application no. DE 10 2022 205 740.6, filed on Jun. 7, 2022 in Germany, the disclosure of which is incorporated herein by reference in its entirety.

BACKGROUND

The disclosure proceeds from a method for operating a control device for controlling an electric motor, in particular a steering system.

In addition, the disclosure relates to a computing unit for carrying out such a method, an actuator assembly comprising such a computing unit, and a steering system comprising such an actuator assembly.

From the prior art, such as DE 10 2019 206 693 A1, control devices for controlling an electric motor, for example in the form of a servomotor of a steering system, are known, wherein a reverse polarity protection switch is used to protect a downstream circuit in the event of a reverse polarity of a supply voltage, by means of which a power current path can be interrupted in such a reverse polarity situation.

When operating such a control device, a basic distinction must be made between the following cases:
1. Normal operation: The reverse polarity protection switch is switched on after the system is switched on.
2. Faulty actuation of the reverse polarity protection switch: The reverse polarity protection switch is not switched on after the system is switched on, for example due to a hardware error.
3. Defect of the reverse polarity protection switch: The reverse polarity protection switch has a fault and is permanently low impedance ("Short") or permanently high impedance ("Open").

Within this context, the second case has the highest probability of fault, since several components interact in the control of the reverse polarity protection switch, so that there is a need to reliably diagnose this fault.

Based on this, the task of this disclosure is in particular to provide a simple method for operating a control device for controlling an electric motor with improved properties with regard to fault diagnosis. The problem is solved by the features described herein, while advantageous configurations and further developments can also be found herein.

SUMMARY

The disclosure is based on a method, in particular a computer-implemented method, for operating a control device for controlling an electric motor, in particular of a vehicle and advantageously of a steering system, wherein the control device comprises at least one power supply, at least one power element operatively connected to the power supply, at least one reverse polarity protection switch arranged in a power current path between the power supply and the power element, and at least one logic unit. In particular, the control device can also include the power current path, which electrically connects the power supply and the power element.

It is proposed that at least one first voltage value correlated with an intermediate circuit voltage and at least one second voltage value correlated with a supply voltage of the logic unit be determined, and be linked with each other and evaluated to determine a faulty actuation of the reverse polarity protection switch. The first voltage value is advantageously tapped after the reverse polarity protection switch, i.e. in particular on a side that faces the power element and/or the electric motor, while the second voltage value is tapped before the reverse polarity protection switch, i.e. in particular on a side that faces the power supply. In particular, the first voltage value in this context can also correspond to the intermediate circuit voltage, while the second voltage value can be identical to the supply voltage of the logic unit. In principle, however, voltage values deviating from this can also be determined, however these are preferably linked to the intermediate circuit voltage or the supply voltage of the logic unit in such a manner that the intermediate circuit voltage or the supply voltage of the logic unit can or could be determined on the basis of the determined voltage values. This configuration can improve fault diagnosis, in particular for faulty actuation of a reverse polarity protection switch. In particular, fault diagnosis can be carried out particularly simply and efficiently within this context, whereby additional components can be advantageously dispensed with and costs minimized.

Within this context, a "control device" is to be understood to refer in particular to at least one part, in particular a subassembly, of an actuator assembly, which is provided in at least one operating state for controlling an operation of at least one electric motor of the actuator assembly. The electric motor is in particular configured as a servo motor, advantageously as a brushless motor, and particularly advantageously as an asynchronous motor or as a permanently excited synchronous motor. Preferably, the electric motor is provided as part of an auxiliary electric power steering and in particular for generating an electric steering assistance. The electric motor can, for example, be designed as a three-phase, six-phase, nine-phase or twelve-phase electric motor. In addition, the power element comprises at least one power electronics unit, which is designed in particular as an inverter unit, in particular as an output stage and/or as a bridge circuit, and is provided for supplying power and/or current to the electric motor. For this the power electronics can comprise several power switches, preferably designed as field-effect transistors, for example in the form of MOSFETs. The power element can furthermore comprise at least one intermediate circuit capacitor or several intermediate circuit capacitors, preferably connected in parallel. Furthermore, a "reverse polarity protection switch" is to be understood in particular as a switching unit which is provided to protect a downstream unit, in particular the power element and/or the electric motor, in a reverse polarity situation. For this purpose, the reverse polarity protection switch has at least one, in particular controllable, control terminal, advantageously a base terminal and/or a gate terminal, at least one, in particular switchable, first power terminal, advantageously an emitter terminal and/or a source terminal, and at least one, in particular switchable, second power terminal, in particular a collector terminal and/or a drain terminal. In addition, the reverse polarity protection switch comprises at least one switching element, advantageously a semiconductor switching element, and preferably a diode, in particular one connected in parallel with the switching element, which can be designed as a body diode, for example. Preferably, the reverse polarity protection switch is herein designed as a transistor and particularly advantageously as a MOSFET. A switching state of the reverse polarity protection switch is further controllable in particular by a control voltage, in particular between the control terminal and the first power terminal, preferably a gate-source voltage. In addition, a "logic unit" is to be understood as an at least partially electrically and/or electronically designed unit, which is in particular electrically connected to the power element, and is preferably provided to perform at least one control functionality, at least one evaluation functionality and/or at least one monitoring functionality. Within this context, the logic unit can be designed as an integrated circuit, preferably as a system base chip, and can comprise, for example, an integrated watchdog unit.

Furthermore, a computing unit can be provided, which is intended to carry out the method for operating the control device. The term "computing unit" is in particular intended to mean an electrical and/or electronic unit which comprises an information input, an information processor, and an information output. Advantageously, the computing unit furthermore comprises at least one processor, at least one memory, at least one input and/or output device, at least one operating program, at least one control routine, at least one calculation routine, at least one evaluation routine and/or at least one determination routine. In the present case, the computing unit can be provided, in particular by means of the determination routine, for determining at least one first voltage value correlated with an intermediate circuit voltage and/or at least one second voltage value correlated with a supply voltage of the logic unit. Furthermore, the computing unit is provided at least to determine, in particular by means of the evaluation routine, a faulty actuation of the reverse polarity protection switch, and to link at least the first voltage value and the second voltage value with each other for this purpose and evaluate them. The computing unit is in this case preferably integrated into a control device of the vehicle, e.g., a central vehicle control device, or a control device of the steering system, in particular in the form of a steering control device. The term "provided" is in particular intended to mean specifically programmed, designed, and/or equipped. The phrase "an object being provided for a specific function" is particular intended to mean that the object fulfills and/or performs this specific function in at least one application and/or operating state.

It is furthermore proposed that a difference between the first voltage value and the second voltage value be determined in order to determine the faulty actuation of the reverse polarity protection switch. Particularly advantageously, the difference between the first voltage value and the second voltage value is then compared with a limit value. The limit value is advantageously greater than 2 V and/or less than 20 V. Typically, the limit value can be within the range between 4 V and 10 V, for example. Preferably, it is also proposed that a system response be triggered in the event that the difference between the first voltage value and the second voltage value exceeds the limit value. Within this context, the system response can consist, for example, of an immediate shutdown of the system or a switch to a redundant further system, for example from a first partial machine of the electric motor to a second partial machine of the electric motor. Preferably, however, the system response comprises ramping a motor torque of the electric motor. Alternatively or additionally, it is conceivable to generate an information message. With this configuration, an advantageously simple evaluation algorithm can be provided, and/or a particularly reliable fault diagnosis can be achieved.

According to a preferred configuration, it is proposed that the first voltage value and/or the second voltage value be determined in an operating state in which the direction of rotation of the electric motor changes, for example due to a reversal at a steering hand grip of the steering system.

Advantageously, it is also proposed within this context that the electric motor in the operating state change from operation in a first direction, for example in a left-hand direction and/or a forward direction, to operation in a second direction, for example in a right-hand direction and/or a reverse direction, so that an energy recovery takes place which leads at least to an increase in the first voltage value and consequently to an increase in the difference between the first voltage value and the second voltage value. Determining the voltage values during operation of the electric motor in reverse direction or during a change of the electric motor in reverse direction has the advantage that a high voltage difference between the voltage values occurs due to the change of direction, which can be determined by means of a conventional and/or simply constructed measuring device. As a result, it is advantageous to dispense with additional components and/or precise measuring equipment, thereby minimizing costs.

Furthermore, it is proposed that the first voltage value be determined in the region of the power element, preferably between the at least one intermediate circuit capacitor and the power electronics unit, and the second voltage value is determined in the region of the logic unit, preferably directly upstream of a supply terminal of the logic unit, wherein the power element and the logic unit are decoupled from one another by means of a decoupling unit, in particular in such a way that the first voltage value and the second voltage value are also decoupled from one another. In this case, the decoupling unit particularly preferably comprises at least one diode and at least one capacitor. In this manner, an advantageous decoupling between the voltage values for determining the faulty actuation of the reverse polarity protection switch can be achieved. In addition, this process has the advantage that voltage drops in the power element, which can also occur during normal operation, do not lead to a failure or reset of the logic.

Further simplification of the fault diagnosis can also be achieved if an analogue-to-digital converter is used to determine the first voltage value and/or the second voltage value. Particularly preferably, a first analogue-to-digital converter is used to determine the first voltage value and a second analogue-to-digital converter is used to determine the second voltage value.

In addition, the disclosure relates to an actuator assembly with an electric motor, in particular the electric motor mentioned above, with a control device, in particular the aforementioned control device, and with a computing unit, in particular the aforementioned computing unit, for carrying out the method. Particularly preferably, the control device, the electric motor and the computing unit are part of a steering system, which is intended in particular for use in a vehicle and preferably a motor vehicle.

The method for operating the control device is not intended to be limited to the application and embodiment described above. In particular, the method of operating the control device to perform a function described herein can utilize a different number of individual elements, components and units from a number described herein.

BRIEF DESCRIPTION OF THE DRAWINGS

Further advantages will become apparent from the description of the drawings hereinafter. The drawings illustrate an embodiment example of the disclosure.

Here.

DETAILED DESCRIPTION

The following embodiment example relates, by way of example, to a steering system. However, in principle, the disclosure is not limited to use in a steering system and could also be used in other areas of a vehicle, for example a wiping system, a window regulator system, and/or a drive system, and/or in other electronic systems, for example in the area of household appliances and/or machine tools.

Figure 1:
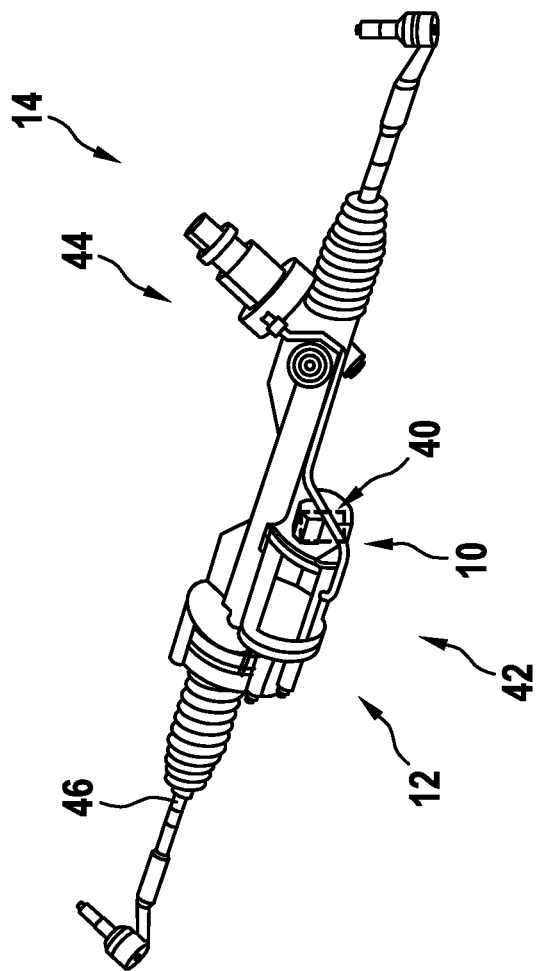
FIG. 1 a part of an exemplary steering system with an actuator assembly comprising an electric motor, a control device and a computing unit in a perspective view, FIG. 2 the control device in a schematic principle illustration, and FIG. 3 an exemplary flow chart with main method steps of a method for operating the control device.

FIG. 1 shows at least a portion of an exemplary steering system 14 in a perspective view. In the present case, the steering system 14 is configured as an electrically assisted steering system. The steering system 14 is configured by way of example as a conventional steering system and comprises an auxiliary electric steering in the form of a power steering. Furthermore, the steering system 14 is provided for use in a vehicle (not shown), in particular a motor vehicle. In an installed state, the steering system 14 is operatively connected to the vehicle wheels (not shown), and is provided in order to influence a direction of travel of the vehicle. Alternatively, however, it is also contemplated to configure a steering system having an electrical superimposed steering and/or active steering. A steering system could furthermore in principle also be configured as a steer-by-wire steering system and/or as a rear axle steering. Moreover, a corresponding steering system could be provided for use in a commercial vehicle.

The steering system 14 comprises a steering gear 44, exemplarily designed as a rack and pinion steering gear, which is provided to convert a steering input into a steering movement of the vehicle wheels. For this purpose, the steering gear 44 comprises at least one steering adjustment element 46, which in the present case is designed in particular as a toothed rack.

Furthermore, the steering system 14 comprises at least one actuator assembly 42. The actuator assembly 42 is designed as a steering actuator and has an operative connection with the steering adjustment element 46. The actuator assembly 42 is provided to provide steering torque. In the present case, the actuator assembly 42 is intended to provide a steering torque in the form of an assistance torque and/or servo torque and to apply it, in particular for steering assistance, to the steering gear 44. Alternatively, however, an actuator assembly could also be part of an electrical superimposed steering and/or active steering, and is in particular provided for providing an additional steering angle and/or variable gear ratio. Furthermore, an actuator assembly could be part of a steer-by-wire steering system. In this case, the actuator assembly could be particularly provided for use in a wheel steering angle adjuster and in particular to provide a steering torque for direct control of a direction of travel of a vehicle. In this case, the actuator assembly could also be provided for use in a control unit of the steer-by-wire steering system and for providing a feedback torque and/or resetting torque to a steering handle. Furthermore, as mentioned above, an actuator assembly could also be used independently of a steering system.

The actuator assembly 42 comprises an electric motor 12 that is known in itself. The electric motor 12 is configured as a synchronous motor, in particular a permanently excited motor. The electric motor 12 is further configured as a multi-phase electric motor. In the present case, the electric motor 12 is configured by way of example as a three-phase electric motor. The electric motor 12 is operatively connected to the steering gear 44, in particular the steering adjustment element 46. The electric motor 12 is provided in order to generate the steering torque. In the present case, the electric motor 12 is part of the auxiliary electric power steering and is in particular used in order to generate the electric steering assistance. In principle, however, an electric motor could also be configured as a six-phase or a twelve-phase electric motor.

Furthermore, the actuator assembly 42 comprises a control device 10. In the present case, the control device 10 is designed as a control device, in particular as a steering control device. The control device 10 has an operative connection with the electric motor 12 and is provided for controlling an operation of the electric motor 12.

In addition, the actuator assembly 42 has a computing unit 40. The computing unit 40 is integrated into the control device 10. The computing unit 40 comprises at least one processor (not shown), for example in the form of a microprocessor, and at least one operating memory (not shown). Furthermore, the computing unit 40 comprises at least one operating program stored in the operating memory with at least one calculation routine, at least one control routine, at least one determination routine and at least one evaluation routine. In principle, however, it is also conceivable to design a computing unit separately from a control device.

Figure 2:
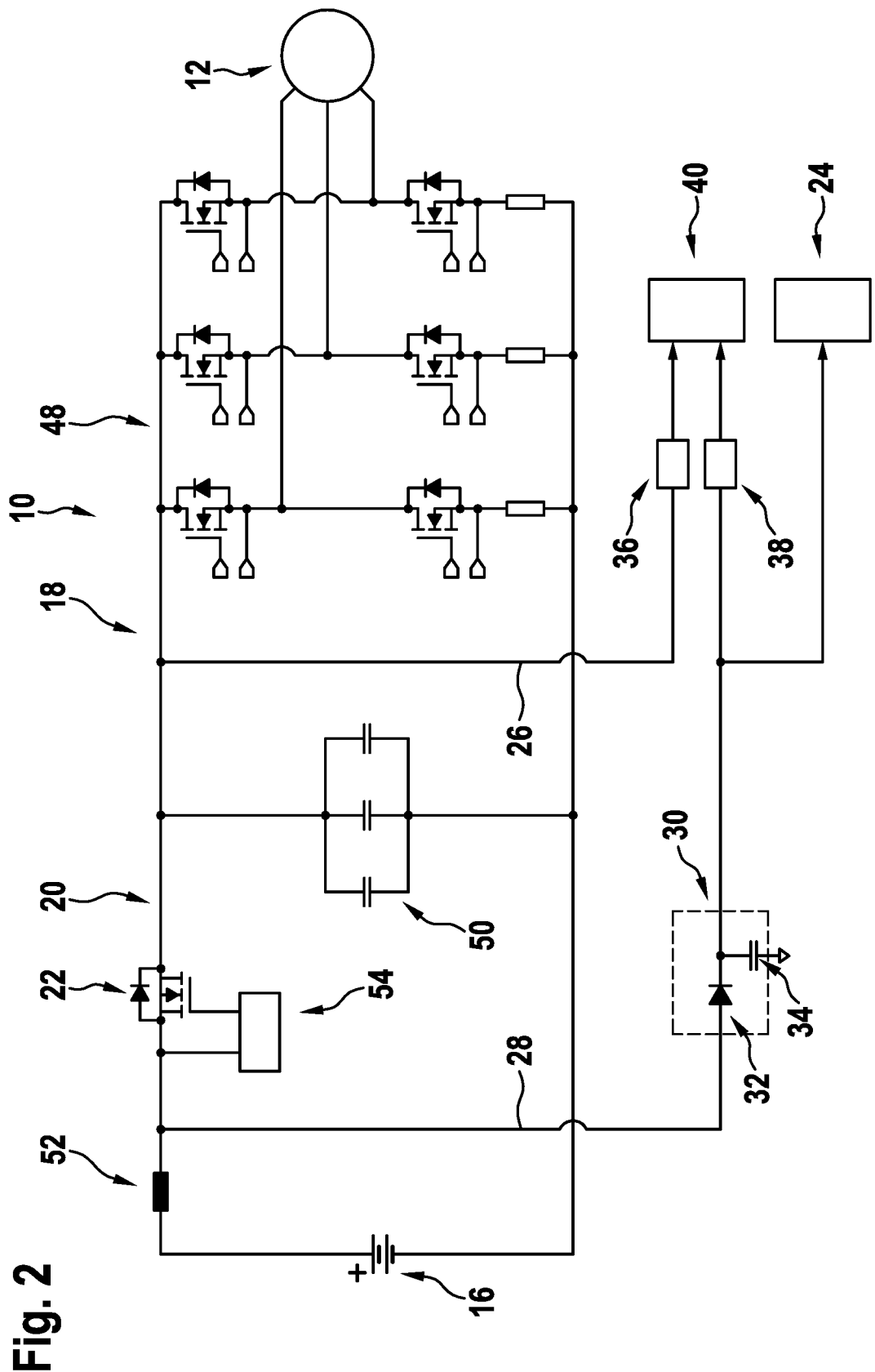

FIG. 2 shows the control device 10 in detail. The control device 10 comprises a power supply 16, a power element 18 and at least one power current path 20 which electrically connects the power supply 16 and the power element 18 to one another.

The power supply 16 is herein designed as a vehicle battery. A first terminal of the power supply 16, in particular a positive voltage terminal, is connected to the power current path 20 and is used in particular to provide a supply voltage. A second terminal of the power supply 16 can be electrically connected to a further power current path and/or a ground terminal. In the present case, the power supply 16 is intended to provide a supply voltage, which can be approximately +12 V, for example. In principle, however, a power supply could also provide a deviating supply voltage.

The power element 18 comprises a power electronics unit 48 that is known in itself. The power electronics unit 48 is designed as an output stage and comprises several half-bridges, wherein one of the half-bridges is assigned to each phase of the electric motor 12. A first terminal of the power electronics unit 48 is electrically connected to the power current path 20 and serves in particular to receive the supply voltage. A second terminal of the power electronics unit 48 can be electrically connected to the further power current path and/or the ground terminal. Further terminals of the power electronics unit 48 are electrically connected to the electric motor 12 and serve in particular to supply the electric motor 12.

Furthermore, the power element 18 has at least one intermediate circuit capacitor 50, which is provided for coupling the power supply 16 and the power electronics unit 48. In this example, the power element 18 comprises three intermediate circuit capacitors 50, which are connected in parallel with each other. A first terminal of the intermediate circuit capacitor 50 or intermediate circuit capacitors 50 is electrically connected to the power current path 20 and/or the first terminal of the power electronics unit 48. A second terminal of the intermediate circuit capacitor 50 or intermediate circuit capacitors 50 can be electrically connected to the further power current path and/or the ground terminal. The intermediate circuit capacitor 50 or intermediate circuit capacitors 50 are connected in parallel to the power electronics unit 48.

In addition, the control device 10 can comprise further components arranged in the power current path 20, such as, for example, an inductor 52, in particular in the form of a throttle. In principle, however, it is also conceivable to omit such an inductor.

Furthermore, the control device 10 comprises a reverse polarity protection switch 22. For clarity, the individual components of the reverse polarity protection switch 22 are not marked with reference numbers in FIG. 2. The reverse polarity protection switch 22 is located in the power current path 20. In the present case, the reverse polarity protection switch 22 is designed as a MOSFET. The polarity reversal protection switch 22 comprises a control terminal, in particular designed as a gate terminal, a first power terminal, in particular designed as a source terminal, and a second power terminal, in particular designed as a drain terminal. The first power terminal is electrically connected to the inductor 52 and/or the first terminal of the power supply 16. The second power terminal is electrically connected to the first terminal of the power electronics unit 48. In addition, the second power terminal is electrically connected to the first terminal of the intermediate circuit capacitor 50 or intermediate circuit capacitors 50. Furthermore, the reverse polarity protection switch 22 comprises a body diode. The body diode is oriented such that an anode terminal of the body diode is oriented towards the power supply 16 and a cathode terminal of the body diode is oriented towards the power electronics unit 48 and/or the intermediate circuit capacitor 50 or intermediate circuit capacitors 50. In principle, however, a reverse polarity protection switch could also be designed as a switch other than a MOSFET, preferably a semiconductor switch.

For controlling the reverse polarity protection switch 22, the control device 10 comprises a driver unit 54 that is known in itself. In terms of circuitry, the driver unit 54 is arranged between the control terminal of the reverse polarity protection switch 22 and the first power terminal of the reverse polarity protection switch 22. The driver unit 54 is provided to provide a control voltage for the reverse polarity protection switch 22.

Furthermore, the control device 10 comprises a logic unit 24. The logic unit 24 is designed as an integrated circuit, in particular as a system base chip, and comprises an integrated watchdog unit (not shown). The logic unit 24, in particular a supply terminal of the logic unit 24, is electrically connected to the power current path 20 and is arranged in particular on a side of the reverse polarity protection switch 22 that faces the power supply 16. In the present case, the logic unit 24 is arranged between the power supply 16 and the reverse polarity protection switch 22 in terms of circuitry. Here, the logic unit 24 is electrically arranged between the inductor 52 and the first power terminal of the reverse polarity protection switch 22.

For decoupling the logic unit 24, the control device 10 can further comprise a decoupling unit 30, in particular optionally. In terms of circuitry, the decoupling unit 30 is arranged between the power supply 16 and the logic unit 24. By means of the decoupling unit 30, the power element 18 and the logic unit 24 are decoupled from each other, so that voltage drops in the power element 18 do not lead to a failure or reset of the logic unit 24. Herein the decoupling unit 30 comprises at least one diode 32 and at least one capacitor 34 designed as a buffer capacitor. The diode 32 is oriented such that an anode terminal of the diode 32 is oriented towards the power current path 20 and a cathode terminal of the diode 32 is oriented towards the logic unit 24. Furthermore, a first terminal of the capacitor 34 is electrically connected to the cathode terminal of the diode 32 and/or the logic unit 24, in particular the supply terminal of the logic unit 24, while a second terminal of the capacitor 34 is connected to the ground terminal. In principle, however, a decoupling unit could also have a different capacitance and/or inductance from a capacitor. In addition, instead of one diode, at least two antiserially connected semiconductor switches or similar could be used. It is furthermore conceivable to entirely dispense with a decoupling unit.

When operating the control device 10, the following cases are to be distinguished in principle:

1. Normal operation: The reverse polarity protection switch 22 is switched on after the system is switched on.
2. Faulty actuation of the reverse polarity protection switch 22: The reverse polarity protection switch 22 is not switched on after the system has been switched on, for example due to a hardware error.
3. Defect of the reverse polarity protection switch 22: The reverse polarity protection switch 22 has a fault and is permanently low impedance ("short") or permanently high impedance ("open").

In this context, the second case has the highest probability of failure, since several components fundamentally interact when controlling the reverse polarity protection switch 22.

Therefore, in order to improve fault diagnosis, a method for operating the control device 10 is proposed below. In particular, the computing unit 40 is provided to carry out the method and has a computer program with corresponding program code means for this purpose. However, another computing unit of a vehicle could alternatively be provided for performing the method.

The computing unit 40 is herein provided for determining at least one first voltage value 26 correlated with an intermediate circuit voltage and at least one second voltage value 28 correlated with a supply voltage of the logic unit 24, and for linking and evaluating them with one another in order to determine faulty actuation of the reverse polarity protection switch 22.

For this purpose, the computing unit 40 is electrically connected to the power element 18, in particular the power current path 20, by means of a first terminal and in particular via a first analogue-to-digital converter 36, in particular in such a manner that the computing unit 40 is arranged between the intermediate circuit capacitor 50 or the intermediate circuit capacitors 50 and the power electronics unit 48 in terms of circuitry. In addition, the computing unit 40 is electrically connected to the logic unit 24, in particular the supply terminal of the logic unit 24, by means of a second terminal and in particular via a second analogue-to-digital converter 38, in particular in such a manner that the computing unit 40 is arranged between the decoupling unit 30 and the logic unit 24 in terms of circuitry.

Thus, at least one first voltage value 26 correlated with an intermediate circuit voltage and at least one second voltage value 28 correlated with a supply voltage of the logic unit 24 are read in via a respective analogue-to-digital converter 36, 38. The first voltage value 26 is tapped after the reverse polarity protection switch 22, i.e. on a side that faces the power element 18 and/or the electric motor 12, while the second voltage value 28 is tapped before the reverse polarity protection switch 22, i.e. on a side that faces the power supply 16. The first voltage value 26 is determined in the area of the power unit 18, in particular between the intermediate circuit capacitor 50 or the intermediate circuit capacitors 50 and the power electronics unit 48, and the second voltage value 28 is determined in the area of the logic unit 24, in particular directly before the supply terminal of the logic unit 24. Subsequently, a difference between the first voltage value 26 and the second voltage value 28 is determined and compared with a limit value in order to determine the faulty actuation of the reverse polarity protection switch 22. The first voltage value 26 and the second voltage value 28 are determined in an operating state in which the direction of rotation of the electric motor 12 changes, wherein the electric motor 12 changes from operation in a first direction, for example counterclockwise rotation, to operation in a second direction, for example clockwise rotation, so that an energy recovery takes place which leads to at least an increase in the first voltage value 26 and consequently an increase in the difference between the first voltage value 26 and the second voltage value 28. In the event that the difference between the first voltage value 26 and the second voltage value 28 exceeds the limit value, for example 4 V, a system response is triggered, wherein the system response can comprise, for example, ramping a motor torque of the electric motor 12. Accordingly, the present method is provided for determining faulty actuation of the reverse polarity protection switch 22, and does not serve to determine a fault of the reverse polarity protection switch 22 itself.

The present method is based on the following consideration in order to detect faulty actuation of the reverse polarity protection switch 22.

In said fault case, the reverse polarity protection switch 22 acts as a diode, since the body diode of the reverse polarity protection switch 22 is still effective. This means that current from the power supply 16 is allowed to pass in the direction of the electric motor 12 (forward operation), while current from the electric motor 12 is blocked in the direction of the power supply 16 (energetic recovery). Energetic recovery occurs, among other things, when the direction of rotation of the electric motor 12 changes, for example simultaneously with the change of direction at a steering hand grip in the form of a steering wheel of the steering system 14. Such energetic recovery results in the current charging the intermediate circuit capacitor 50 or the intermediate circuit capacitors 50 to a higher voltage, and the first voltage value 26 increases. From a system point of view, this can then be diagnosed by exceeding the limit value. A determination of the voltage values 26, 28 during energetic recovery, for example caused by a reversal of the direction of rotation of the electric motor 12, has the advantage that a high voltage difference between the voltage values 26, 28 occurs due to the change of direction, which is significantly higher than a voltage difference in normal operation, so that conventional and/or simply constructed measuring devices, for example in the form of a voltage divider and an additional analogue-digital converter, can be used.

Figure 3:
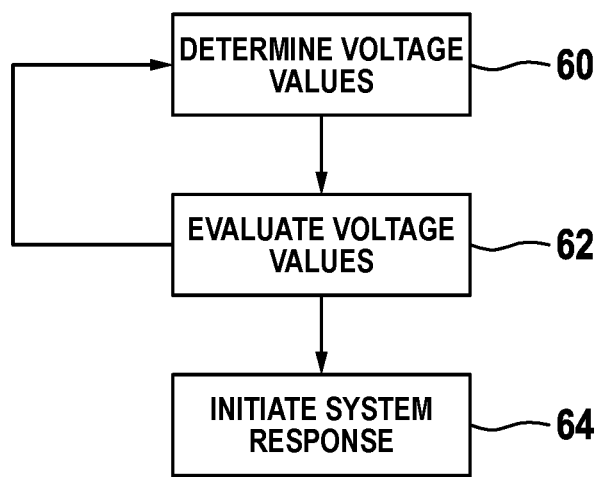

Finally, FIG. 3 shows an exemplary flow chart with main method steps of the method for operating the control device 10.

In a method step 60, at least one first voltage value 26 correlated with an intermediate circuit voltage and at least one second voltage value 28 correlated with a supply voltage of the logic unit 24 are read in via the respective analogue-to-digital converter 36, 38.

In a method step 62, the first voltage value 26 and the second voltage value 28 are linked and evaluated to determine faulty actuation of the reverse polarity protection switch 22. Within this context, a difference between the first voltage value 26 and the second voltage value 28 is preferably determined and adjusted with a limit value, for example 4 V.

In the event that the difference between the first voltage value 26 and the second voltage value 28 does not exceed the limit value, method step 60 follows again.

In the event that the difference between the first voltage value 26 and the second voltage value 28 exceeds the limit value, a method step 64 follows.

In method step 64, a system response is initiated, wherein the system response can comprise, for example, ramping a motor torque of the electric motor 12. Alternatively or additionally, it is conceivable to generate an information message.

The exemplary flow chart in FIG. 3 is only intended to describe an exemplary method for operating the control device 10. Individual method steps can in particular also vary, or additional method steps can be added. Within this context, for example, it is conceivable to dispense with ramping a motor torque of the electric motor 12, instead switching off the system immediately. Furthermore, the system response could be to switch to a redundant further system, for example from a first sub-machine of the electric motor 12 to a second sub-machine of the electric motor 12.

The invention claimed is:

1. A method for operating a control device for controlling an electric motor, the control device including at least one power supply, at least one power element which is operatively connected to the power supply, at least one polarity reversal protection switch which is arranged in a power current path between the power supply and the power element, and at least one logic unit, the method comprising:
    determining at least one first voltage value correlated with an intermediate circuit voltage and at least one second voltage value correlated with a supply voltage of the logic unit; and
    linking the at least one first voltage value and the at least one second voltage value to one another and evaluating the at least one first voltage value and the at least one second voltage value to determine faulty actuation of the reverse polarity protection switch,
    wherein the at least one first voltage value is determined in a region of the at least one power element and the at least one second voltage value is determined in a region of the at least one logic unit, and
    wherein the at least one power element and the at least one logic unit are decoupled from one another by a decoupling unit.

2. The method according to claim 1, wherein the determining of the faulty actuation of the reverse polarity protection switch includes:
    determining a difference between the at least one first voltage value and the at least one second voltage value; and
    comparing the difference with a limit value.

3. The method according to claim 2, further comprising:
    triggering a system response in response to the difference between the at least one first voltage value and the at least one second voltage value exceeds the limit value.

4. The method according to claim 3, wherein the system response includes ramping a motor torque of the electric motor.

5. The method according to claim 1, wherein the at least one first voltage value and the at least one second voltage value are determined in an operating state in which a direction of rotation of the electric motor changes.

6. The method according to claim 5, wherein, in the operating state, the direction of the electric motor changes from operation in a first direction to operation in a second direction and an energy recovery takes place resulting in at least an increase in the at least one first voltage value.

7. The method according to claim 1, wherein the decoupling unit includes at least one diode and at least one capacitor.

8. The method according to claim 1, wherein the determining of the at least one first voltage value and the at least one second voltage value includes using an analog-to-digital converter used to determine the at least one first voltage value and/or the at least one second voltage value.

9. The method according to claim 1, wherein the electric motor is included in a steering system.

10. A computing unit comprising:
at least one processor; and
at least one non-transitory memory comprising stored program instructions that, when executed by the at least one processor, cause the at least one processor to execute the method according to claim 1.

11. An actuator assembly, comprising:
an electric motor;
a control device including at least one power supply, at least one power element which is operatively connected to the power supply, at least one polarity reversal protection switch which is arranged in a power current path between the power supply and the power element, and at least one logic unit; and
a computing unit comprising at least one processor and at least one non-transitory memory comprising stored program instructions that, when executed by the at least one processor, cause the at least one processor to:
determine at least one first voltage value correlated with an intermediate circuit voltage and at least one second voltage value correlated with a supply voltage of the logic unit; and
link the at least one first voltage value and the at least one second voltage value to one another and evaluating the at least one first voltage value and the at least one second voltage value to determine faulty actuation of the reverse polarity protection switch,
wherein the at least one first voltage value and the at least one second voltage value are determined in an operating state in which a direction of rotation of the electric motor changes, and
wherein, in the operating state, the direction of the electric motor changes from operation in a first direction to operation in a second direction and an energy recovery takes place resulting in at least an increase in the at least one first voltage value.

12. The actuator assembly according to claim 11, wherein the determining of the faulty actuation of the reverse polarity protection switch by the computing unit includes:
determining a difference between the at least one first voltage value and the at least one second voltage value; and
comparing the difference with a limit value.

13. The actuator assembly according to claim 12, further comprising:
triggering a system response in response to the difference between the at least one first voltage value and the at least one second voltage value exceeds the limit value.

14. The actuator assembly according to claim 13, wherein the system response includes ramping a motor torque of the electric motor.

15. The actuator assembly according to claim 11, wherein:
the at least one first voltage value is determined in a region of the at least one power element and the at least one second voltage value is determined in a region of the at least one logic unit, and
the at least one power element and the at least one logic unit are decoupled from one another by a decoupling unit.

16. The actuator assembly according to claim 15, wherein the decoupling unit includes at least one diode and at least one capacitor.

17. The actuator assembly according to claim 11, wherein the determining of the at least one first voltage value and the at least one second voltage value includes using an analog-to-digital converter used to determine the at least one first voltage value and/or the at least one second voltage value.

18. A steering system comprising:
an actuator assembly comprising:
an electric motor;
a control device including at least one power supply, at least one power element which is operatively connected to the power supply, at least one polarity reversal protection switch which is arranged in a power current path between the power supply and the power element, and at least one logic unit; and
a computing unit comprising at least one processor and at least one non-transitory memory comprising stored program instructions that, when executed by the at least one processor, cause the at least one processor to:
determine at least one first voltage value correlated with an intermediate circuit voltage and at least one second voltage value correlated with a supply voltage of the logic unit; and
link the at least one first voltage value and the at least one second voltage value to one another and evaluating the at least one first voltage value and the at least one second voltage value to determine faulty actuation of the reverse polarity protection switch,
wherein the at least one first voltage value is determined in a region of the at least one power element and the at least one second voltage value is determined in a region of the at least one logic unit, and
wherein the at least one power element and the at least one logic unit are decoupled from one another by a decoupling unit.

19. The steering system according to claim 18, wherein the decoupling unit includes at least one diode and at least one capacitor.

20. The steering system according to claim 18, wherein:
the at least one first voltage value and the at least one second voltage value are determined in an operating state in which a direction of rotation of the electric motor changes, and
in the operating state, the direction of the electric motor changes from operation in a first direction to operation in a second direction and an energy recovery takes place resulting in at least an increase in the at least one first voltage value.

* * * * *